United States Patent [19]

Kolb et al.

[11] Patent Number: 4,956,419

[45] Date of Patent: Sep. 11, 1990

[54] FLUORINE-CONTAINING POLYMERS WITH PENDENT THIOORGANO GROUPS AND METHOD OF MAKING SAID POLYMERS

[75] Inventors: Robert E. Kolb; Paul F. Tuckner; Richard A. Guenthner, all of St. Paul, Minn.

[73] Assignee: Minnesota Mining and Manufacturing Company, St. Paul, Minn.

[21] Appl. No.: 429,072

[22] Filed: Nov. 20, 1989

Related U.S. Application Data

[62] Division of Ser. No. 165,936, Mar. 9, 1988, Pat. No. 4,894,410.

[51] Int. Cl.$^5$ ............................................. C08F 8/34
[52] U.S. Cl. ................................. 525/342; 525/326.3; 525/343; 525/348; 525/350; 525/352; 525/375
[58] Field of Search ............... 525/342, 343, 348, 350, 525/352, 375

[56] References Cited

U.S. PATENT DOCUMENTS

| | | | |
|---|---|---|---|
| 2,968,649 | 1/1961 | Pailthorp et al. | 526/264 |
| 3,039,992 | 6/1962 | Smith | 524/420 |
| 3,041,316 | 6/1962 | Griffin | 525/276 |
| 3,051,667 | 8/1962 | Rexford . | |
| 3,159,609 | 12/1964 | Harris et al. | 526/247 |
| 3,318,854 | 5/1967 | Honn et al. | 526/249 |
| 3,467,635 | 9/1969 | Brasen et al. | 526/255 |
| 3,758,447 | 9/1973 | Falk | 526/243 |
| 4,164,463 | 8/1979 | Fang | 204/296 |
| 4,214,060 | 7/1980 | Apotheker et al. | 525/387 |
| 4,233,421 | 11/1980 | Worm | 525/343 |
| 4,259,463 | 3/1981 | Moggi et al. | 525/340 |
| 4,263,414 | 4/1981 | West | 525/102 |
| 4,296,224 | 10/1981 | Fukui et al. | 526/243 |
| 4,565,854 | 1/1986 | Sato et al. | 526/214 |
| 4,574,139 | 3/1986 | Sato et al. | 525/61 |
| 4,619,974 | 10/1986 | Mueller | 525/332.4 |

FOREIGN PATENT DOCUMENTS 856320 12/1960 United Kingdom .

OTHER PUBLICATIONS

J. F. Smith, "Diothiol Curing Agents for 'Viton' a Fluoroelastomer", Rubber World, May, 1959, pp. 263-266.
West, A. C. & Holcomb, A. G., "Fluorinated Elastomers", Kirk-Othmer, Encyclopedia of Chemical Technology, 3rd Ed., 8, pp. 500-515, John Wiley & Sons, Inc. (1979).
Kovach, G. P., "Release Agents", Encyclopedia of Polymer Science and Technology, 12, pp. 57-65, John Wiley & Sons, Inc. 1980.
Morton, Rubber Technology, Chapter 2, pp. 19-50 and Chapter 16, pp. 407-439, Van Nostrand Reinhold Company, 1973.

Primary Examiner—Christopher Henderson
Attorney, Agent, or Firm—Donald M. Sell; Walter N. Kirn; Eloise J. Maki

[57] ABSTRACT

This invention provides fluorine-containing polymers having a plurality of thioorgano groups. These polymers are prepared by reacting a fluoropolymer precursor with one or more, organic, thiolate compounds thereby modifying the fluoropolymer precursor by grafting onto its backbone the thioorgano groups. Said thioorgano groups may contain functional moieties that modify the cure properties, bulk properties or compatibility of the thioorgano fluoropolymer precursor. This invention also provides shaped or formed cured articles, coatings and solutions comprising the thioorgano fluoropolymers, and blends thereof with other compatible polymers.

10 Claims, No Drawings

FLUORINE-CONTAINING POLYMERS WITH PENDENT THIOORGANO GROUPS AND METHOD OF MAKING SAID POLYMERS

This is a division of application Ser. No. 165,936, filed Mar. 9, 1988.

This invention relates to fluorine-containing polymers. In a further aspect, it relates to methods of making and curing said polymers. In still a further aspect it relates to shaped articles or coatings comprising said cured polymer.

The use of dithiols as curing agents for fluorocarbon elastomers is disclosed in the art. U.S. Pat. No. 3,039,992 (Smith) describes a curing process for vinylidene fluoride-hexafluoropropene copolymers and copolymers of vinylidene fluoride, hexafluoropropene and tetrafluoroethylene. The cure system includes a curing agent selected from the group consisting of the carbamate of a 2 to 6 carbon atom alkylene diamine, an N,N'-diarylidene diamine, and an organic dithiol in combination with an aliphatic tertiary amine, and an inorganic sulfide. J. F. Smith, "Dithiol Curing Agents for 'Viton' a Fluoroelastomer", Rubber World, May 1959, pp. 263–266 describes a fluoroelastomer cure system that includes a dithiol cross-linking agent, an amine cocuring agent and an acid acceptor. U.S. Pat. No. 3,041,316 (Griffin) discloses that hydrocarbon polymers can be vulcanized with polyfunctional cross-linking agents such as dimercaptans. U.S. Pat. No. 4,259,463 (Moggi et al) discloses vulcanizable compositions of vinylidene fluoride copolymer elastomers comprising, in addition to the elastomeric fluoride copolymer, an inorganic acid acceptor, a basic compound, a polyhydroxy or polythiol vulcanizing agent, and an aminophosphinic compound.

Some other, sulfur- and fluorine-containing polymers are disclosed in U.S. Pat. No. 4,619,974 (Mueller) wherein perfluoroalkyl alkylene substituted polydienes are obtained by addition of perfluoroalkyl-alkylene thiols to polydienes, and U.S. Pat. No. 4,164,463 (Fang) wherein fluoropolymers are chemically modified with sulfur or phosphorus containing compounds.

This invention provides a novel class of fluorine-containing organic polymers having at least one, and preferably a plurality of, thioorgano groups. Said organic polymers are occasionally hereinafter for brevity referred to as thioorgano fluoropolymers. Where the thioorgano fluoropolymer contains more than one such pendent group, the organic portion of the groups can be different. The number of thioorgano groups can vary, but generally said thioorgano fluoropolymers will contain about 0.02 to 10 weight percent of the thio moiety, —S—. Said thioorgano group, which can be expressed as —SR where R is an organo moiety, e.g. alkyl, may contain one or more functional (or reactive) moieties, e.g., a hydroxy moiety. Where said pendent group contains more than one functional moiety, said moieties can be different. Said thioorgano fluoropolymer can be prepared by reacting a fluorine-containing homo- or copolymer hereinafter for brevity occasionally referred to as a fluoropolymer precursor, comprising repeating, interpolymerized units of one or more monomers selected from the group of fluoromonomers, e.g. vinylidene fluoride and hexafluoropropylene, and non-fluorinated monomers, e.g. propylene, with one or more organic thiolate compounds which serve as precursors for the thioorgano groups, such reaction modifing the fluoropolymer precursor by grafting onto its backbone the thioorgano groups. This invention also provides cured, shaped articles or coatings comprising said thioorgano fluoropolymer or blends thereof with other compatible polymers.

Fluorine-containing homo- and copolymers, or fluoropolymer precursors, useful in this invention can be normally liquid or solid and are thiolate-reactive. Said precursors can contain 20 to 76 weight percent of carbon-bonded fluorine and preferably 35 to 70 weight percent of carbon-bonded fluorine.

Homopolymers useful as fluoropolymer precursors are those comprising repeating, interpolymerized units of fluoromonomers such as bromotrifluoroethylene and chlorotrifluoroethylene monomers.

Many of the copolymers useful as fluoropolymer precursors in this invention are copolymers of vinylidene fluoride and one or more other co-monomers, and are described in the prior art, for example, U.S. Pat. Nos. 3,159,609 (Harris et al), 3,467,635 (Brasen et al), 4,214,060 (Apotheker), 4,233,421 (Worm), 4,263,414 (West), and West, A. C. and Holcomb, A. G., "Fluorinated Elastomers", Kirk-Othmer, *Encyclopedia of Chemical Technology*, 3rd Ed. 8, pp. 500–515 John Wiley & Sons, Inc. (1979). Among said copolymers are the copolymers of two or more of the following fluoromonomers: vinylidene fluoride, hexafluoropropene, tetrafluoroethylene, chlorotrifluoroethylene, 2-chloropentafluoropropene, pentafluoropropene, dichlorodifluoroethylene, trifluoroethylene, 1,1-chlorofluoroethylene, 1-bromo-2,2-difluoroethylene, perfluoromethylvinyl ether and mixtures thereof, and optionally in addition such fluoromonomer cure site monomers as 3-iodoperfluoropropene, 4-iodoperfluoropentene, bromotrifluoroethylene, bromodifluoroethylene and mixtures thereof. Said fluoromonomers may also be copolymerized with non-fluorinated monomers, e.g., ethylene, propylene and butene. One useful class of copolymers are copolymers of vinylidene fluoride with at least one terminally ethylenically unsaturated fluoromonomer containing at least one fluorine atom substituent on each double-bonded carbon atom, each carbon atom of said fluoromonomer being substituted only with fluorine and optionally with chlorine, hydrogen, lower fluoroalkyl radical, or lower fluoroalkoxy radical, particularly hexafluoropropene, tetrafluoroethylene, chlorotrifluoroethylene, and 1-hydropentafluoropropene. Particularly preferred are the fluorinated elastomers produced by copolymerizing vinylidene fluoride with hexafluoropropene as described in U.S. Pat. Nos. 3,051,677 (Rexford) and 3,318,854 (Honn et al), and those copolymers produced by copolymerizing vinylidene fluoride, hexafluoropropene, and tetrafluoroethylene as described in U.S. Pat. No. 2,968,649 (Pailthorp). Illustrative of this class are copolymers of hexafluoropropene and vinylidene fluoride containing between about 15 and about 50 mole percent hexafluoropropene, optionally with the addition of up to 30 mole percent tetrafluoroethylene.

Some of the fluoropolymer precursors useful in this invention are commercially available, e.g., those from 3M Company as Fluorel ® fluoroelastomer, e.g. FC-2175, and FT-2430, from E. I. Dupont De Nemours & Company as Viton ® fluoroelastomers, e.g. Viton A, Viton B and Viton GLT, from Daikin Kogyo Co., Ltd., as Daiel fluoroelastomers, e.g., Daiel G-902, Daiel G-101 and Daiel G-201, and from Montefluos, S. A. as Technoflon ™ NM and Tecnoflon ™ TN fluoroelastomers.

Table 1 sets forth the approximate composition of some commercially available homo and copolymers which are particularly useful in the practice of this invention.

TABLE 1

| No. Code | Composition of polymer, mole % | | | | | | Approximate molecular weight of polymer (**) No. |
|---|---|---|---|---|---|---|---|
| | $CF_2=CH_2$ | $C_3F_6$ | $CF_2=CF_2$ | $CF_3OCF=CF_2$ | $CFBr=CF_2$ | $CF_2=CFCl$ | |
| 1 | 78.8 | 21.2 | | | | | 3,000 |
| 2 | 78 | 22 | | | | | 28,000 |
| 3 | 78 | 22 | | | | | 50,000 |
| 4 | 78 | 22 | | | | | 80,000 |
| 5 | 44 | 31 | 25 | | | | 80,000 |
| 6* | 51 | 27 | 22 | | | | 100,000 |
| 7* | 77 | | 5 | 18 | | | 100,000 |
| 8 | 49 | 27 | 24 | | | | 80,000 |
| 9 | | | | | 100 | | 1,000 |
| 10 | | | | | | 100 | 500 |
| 11 | 30 | | | | | 70 | 80,000 |
| 12 | 69 | | | | | 31 | 150,000 |
| 13 | 78 | 22 | | | | | 120,000 |

*Gums 6 and 7 also contain a very small amount of a bromine-containing, fluorinated monomer the amount being such as to provide 0.05–0.4 wt. % of the monomer in the gum as a cure site for subsequent crosslinking. Gum 8 contains a very small amount of an iodine-containing cure site monomer the amount being such as to provide 0.1% of the monomer in the gum as a cure site for subsequent crosslinking.
**Molecular weight was determined by vapor phase osmometry, high speed membrane osmometry, or estimated from Mooney viscosity values.

Thiolate compounds considered useful in this invention as precursors for the thioorgano groups are metal salts of organic, monothiol compounds, and may contain one or more reactive or functional moieties other than the thiolate moiety. A class of the thiolates has the general formula:

$$RS(M)_{1/a} \qquad (I)$$

where M is a metal atom, e.g. sodium, lithium, potassium, and calcium, a is the valence of M, and R is an organic group, such as aliphatic (i.e. straight chain, branched chain and if sufficiently large, cyclic, or a combination thereof, such as alkylcycloaliphatic, and the aliphatic skeleton can include heteroatoms, e.g. oxygen bonded only to carbon atoms), aromatic, or a combination thereof, e.g. alkyl, aryl, alkenyl, aralkyl, alkaryl and alkaralkyl, that may be substituted (including monosubstituted and polysubstituted) or not substituted at all, with functional moieties, such as hydroxy, carboxy, sulfo, amino, and alkoxy silyl, wherein said functional moieties are bonded to a C atom of the R group. The R group may also be monosubstituted, polysubstituted or not substituted at all with moieties that will not easily react with base, e.g. sodium hydroxide, such as chloro, cyano, carboxamide, alkoxy and alkoxy carbonyl. Said R group can have one or more carbon atoms, e.g. up to 20 or more, and preferably 1 to 20 carbon atoms. A particularly useful subclass of thiolate compounds within the scope of formula (I) has the general formula:

$$(A)_n R'S(M)_{1/a} \qquad (II)$$

where M' and a are the same as described above, A is a functional moiety, n is 1 or 2, and R' is likewise an organic group such as aliphatic, aromatic or combinations thereof.

The thiolate compound can be prepared by reacting a selected, suitable thiol, with an equivalent amount of the desired metal hydroxide or alkoxide in a solvent such as methanol. By suitable it is meant that its thiols must be stable to thiolate salt formation, i.e. the thiol will not hydrolyze, decompose or otherwise degrade when reacted with a strong base such as lithium, sodium or potassium hydroxide or methoxide. An example of an unsuitable thiol is 3-chloropropanethiol which dehydrochlorinates in the presence of base.

A useful method to prepare thiolates whose divalent metal hydroxides are not soluble in methanol is an ion-exchange procedure. For example, an alkaline earth thiolate, e.g. calcium thiolate, can be prepared by adding an equivalent amount of sodium thiolate to a solution of an alkaline earth chloride, e.g. calcium chloride, dissolved in methanol. A methanol solution of the alkaline-earth thiolate, e.g. calcium thiolate, remains after sodium chloride forms and precipitates.

Representative mono-thiols are 2-mercaptoethanol, 3-mercapto-1,2-propanediol, mercaptoacetic acid, 3-mercaptopropionic acid, 10-mercaptodecanoic acid, thiosalicylic acid, 2-mercaptopyrimidine, 2-mercaptopyridine, 3-mercaptopropyltrimethoxysilane, 3-mercaptopropyl methyldimethoxysilane, 2-aminoethanethiol, 4-aminothiophenol, 4-chlorothiophenol, 2-(mercaptomethyl)furan, hexanethiol, hexadecanethiol, phenylmethanethiol, n-hexadecanethiol, phenylpropanethiol, triphenylmethanethiol, n-heptanethiol, cyclohexanethiol, 1,1,2,2-tetrahydroperfluorodocanethiol, 2-aminothiophenol, N-(4-mercaptobutyl)-N-methyl perfluorooctanesulfonamide, and monothiol-group-containing poly(dimethylsiloxane).

Thiolate solutions can be reacted directly with a solution of the fluoropolymer precursor, or the thiolate compound can be isolated from the solvent by evaporation and used in a solid state reaction with said fluoropolymer precursor.

While the exact mechanism by which said fluoropolymer precursor and thiolate compound react is not known it is believed that said thioorgano groups are pendent groups each of which is covalently bonded through its sulfur atom to a carbon atom in the backbone of the fluoropolymer precursor. The number of thioorgano groups contained in a thioorgano fluoropolymer may vary, however, generally thioorgano fluoropolymers will contain between 0.02 to 10 weight percent, and preferably 0.1 to 5 weight percent, of the thio moiety, —S—.

Several variables can be adjusted to provide different thioorgano fluoropolymer compositions and properties. These include:

1. fluoropolymer precursor composition
2. fluoropolymer precursor molecular weight
3. thiolate composition 4. thiolate concentration relative to the concentration of fluoropolymer precursor in the reaction mixture.

The fluoropolymer precursor's composition largely determines the bulk properties, e.g. high temperature stability, and chemical inertness, of its resulting thioorgano fluoropolymer. The thioorgano fluoropolymer precursor's molecular weight can have an effect on the processibility of the resultant thioorgano fluoropolymer, e.g. solubility in common, organic solvents for coating applications, curability, and extrudability. The thiolate composition can modify selected properties of the thioorgano fluoropolymer, e.g. compatibility with other polymers, solubility in organic solvents, release properties or surface adhesion properties, and curability. The thiolate concentration relative to the concentration of the fluoropolymer precursor in the reaction mixture can determine the extent to which the thiolate groups will modify the selected properties of the fluoropolymer precursor, e.g. cure rate, and degree of compatibility of the thioorgano fluoropolymer with other polymers.

The thioorgano fluoropolymers of this invention can be prepared in solution by adding a solution of the selected thiolate or thiolates in a polar solvent such as methanol to a solution of the fluoropolymer precursor in a suitable, reaction solvent, e.g. ketones, esters and ethers. Ketones, e.g. acetone and methyl ethyl ketone (MEK), and ethers, e.g. the dimethyl ether of ethyleneglycol, are preferred reaction solvents while esters such as butyl acetate are less useful because they can react with the thiolate compounds. Polar cosolvents, e.g. alcohols, can be useful in moderating the reactivity of the salts, and in some cases, prevent gelation of the thioorgano fluoropolymer product. A small amount of an amine, e.g. dibutylamine, can be added to the thiolate-polymer solution. In the case of the thiolate salt of 3-mercaptopropyltrimethoxysiloxane, addition of the amine, permitted up to an 80% reduction in the amount of thiolate required to react with the fluoropolymer precursor and yielded a thioorgano fluoropolymer having the desired, final cure properties.

Some of the thioorgano fluoropolymers of this invention can be prepared in situ by adding the thiol or thiols directly to a solution of the fluoropolymer precursor in the reaction solvent, and by subsequently adding an equivalent quantity, based on the hydroxy equivalent of the thiol or thiols, of a base, e.g. sodium hydroxide and sodium methoxide, dissolved in a suitable solvent, e.g. methanol.

Some of the thioorgano fluoropolymers of this invention can be prepared using solid-state reactions. The thiolate or thiolates, an inorganic base, e.g calcium hydroxide and magnesium oxide, and at least one vulcanization accelerator, e.g. organo-onium compounds such as quaternary ammonium and phosphonium salts, can be dispersed or milled into a fluoropolymer precursor gumstock by employing any of the useful rubber mixing devices, such as internal mixers, roll mixers, or any other convenient mixing device. The temperature of the mixture in the mixing device preferably should not be allowed to rise above about 120° C. After the fluoropolymer composition is well blended it is heated to about 175° C. for about 5 to 15 minutes to complete the grafting reaction to yield the thioorgano fluoropolymer.

The thioorgano fluoropolymers of this invention can be cured (that is, crosslinked or vulcanized) by various means to yield shaped articles films or coatings. The type of curing or crosslinking agent required to effect a cure of the thioorgano fluoropolymers of the invention will depend on the type of functional moieties, if any, contained in the pendent groups. For example, some of the thioorgano fluoropolymers of this invention have reactive moieties that can react with added curing agents to crosslink polymer chains, e.g. pendent hydroxy moieties can react with added diisocyanate or anhydride compounds which crosslink polymer chains thus curing the fluoropolymer. Other thioorgano fluoropolymers have functional moieties, e.g. hydroxy moieties, that can react directly with sites on other polymer chains to form crosslinks, thus curing the fluoropolymer. Some thioorgano fluoropolymers with trimethoxysilyl moieties can react with adventitious moisture to form crosslinks, thus curing the fluoropolymer.

The thioorgano fluoropolymers can be compounded with other compatible polymers and other conventional chemical compounding ingredients or adjuvants customarily known to be useful or necessary in processing, fabricating, stabilizing and vulcanizing polymers. The thioorgano fluoropolymers and any crosslinking agents, co-curing agents, accelerators, processing aids, softeners, plasticizers, retarding agents, reinforcing agents or fillers, e.g. calcium carbonate, and silica, pigments, waxes and carbon black, catalysts, e.g., dibutyltin laurate, and divalent metal oxide and/or hydroxide acid acceptors can be dispersed or dissolved in a suitable solvent, e.g. methanol and MEK, by employing any convenient means of mixing, or said chemical compounding ingredients or adjuvant can be dispersed in or compounded with, a gumstock comprising thioorgano fluoropolymers and any compatible polymers by employing any of the useful mixing devices, such as internal mixers, roll mixers, or any other convenient mixing device. When compounding ingredients into a gumstock, the temperature in the mixing device preferably should not be allowed to rise above 120° C. The choice of such crosslinking agents will depend primarily upon the class of thioorgano fluoropolymers and other optional compatible polymers used. In the case of fluoroelastomers, depending upon the particular fluoroelastomer used, curing agents can be selected from polyamines, aromatic polyhydroxy, and organoperoxides in combination with a cocuring agent, e.g. triallylisocyanurate.

Some of the thioorgano fluoropolymers are fluoroelastomers with pendent hydroxy moieties which can be cured at low temperature (i.e. below 95° C.) upon addition of a suitable crosslinking agent, e.g., anhydride compound, or diisocyanate compound. Other room temperature curable thioorgano polymers are fluoroelastomers with pendent trimethoxysilyl moieties which can be cured at room temperature (i.e. approximately 22° C.), by reaction with adventitious moisture without addition of a cure agent. Prior to this invention, many fluoroelastomers cured in solution at room temperature were not stable at high temperatures because the curing agents that were sufficiently reactive at room temperature to cure the fluoroelastomer, e.g., diamines or polyamines would degrade the cured fluoroelastomer at elevated temperatures. Some of the thioorgano fluoropolymers of this invention which are fluoroelastomers with trimethoxysilane moieties not only can be cured at approximately room temperature, but exhibit good stability at elevated temperature (i.e. above 177° C.). Also, solutions of some of thioorgano fluoropolymers that are not curable at room temperature can be mixed with appropriate conventional adjuvants and compounding ingredients and suitable solvent and stored as a solution until it is desired to use the polymer solution, e.g. to prepare a coating.

Where the thioorgano fluoropolymer and its suitable chemical compounding ingredient or adjuvants are dissolved or dispersed in a suitable solvent, said mixture can be coated on a substrate via brush, roller, dip, spray or other known techniques for solvent application of coatings, and heated, e.g. an in air oven, or allowed to cure at room temperature until the desired cure properties are achieved. Where the chemical compounding ingredients are milled into a thioorgano fluoropolymer gumstock, the compounded curable gumstock can be extruded or pressed in a mold, and subsequently heated or baked in an oven. The pressing of the compounded gumstock (called "press cure") will usually be conducted at a temperature between about 95° C. and about 230° C., preferably between about 150° C. and about 205° C. for a period of from one minute to about 15 hours, usually from five minutes to 30 minutes. A pressure of between about 700 kPa and about 20,600 kPa, preferably between about 3,400 kPa and about 6,800 kPa, is usually imposed on the compounded gumstock in the mold. The molded vulcanizate will then be usually "post cured" (oven cured) at a temperature between about 150° C. and about 315° C., usually at about 260° C. for a period of from about two hours to 50 hours or more depending on the cross-sectional thickness of the molded article. For thick sections, the temperature during the post cure will usually be raised gradually from the lower limit of the range of the desired maximum temperature selected. For thinner sections, e.g., less than 5 mm, the section may be put into the oven at the desired maximum temperature. The maximum temperature used is preferably about 260° C. and is held at this value for about 24 hours or more.

Many fluoropolymers exhibit deficiencies such as (a) insolubility in many aromatic or hydrocarbon organic solvents, e.g. toluene, making coatings difficult to prepare, (b) incompatibility with non-fluorine-containing polymers, and (c) poor surface wetting and surface adhesion properties. This invention provides a method of conveniently increasing the compatibility of fluoropolymers with non-fluorine-containing polymers, improving the solubility of fluoropolymers in normally incompatible organic solvents and modifying the bulk properties of fluoropolymers, e.g., by increasing surface wetting properties, and improving release properties.

The compatibility and solubility of fluoropolymers can be improved by reacting said fluoropolymer precursors with thiolates containing moieties that make the thioorgano fluoropolymer similar in nature to that of the desired blending resin or solvent. For example, for polar resins, e.g polyesters, or polar solvents, e.g. methanol, the moiety should also be polar in nature, e.g. such as carboxy, and sulfo. For non-polar resin matrices, e.g. vinyl polymers, or non-polar solvents, e.g. toluene, the compatibilizing moiety should be predominantly hydrocarbon in nature, e.g. alkyl. Some of the thioorgano fluoropolymers with pendent hydroxy moieties may be compatible with some previously incompatible materials, e.g. epoxies, polyols, polyethers, polyesters, phenolic resins, melamine resins, and polyacrylates. Thus they can be blended with said materials to modify some of their bulk properties, e.g., temperature stability, chemical inertness, electrical resistivity, surface wetting, and surface adhesion properties. For example, epoxy-compatible, thioorgano fluoropolymers with pendent hydroxy moieties can be used as thermally stable impact modifiers, chemically resistant flexibilizers and cocuring agents when blended with epoxies. Some thioorgano fluoropolymers with pendent polysiloxane moieties can be blended with fluoroelastomers to improve the release properties of said fluoroelastomers, and some thioorgano fluoropolymers with pendent sulfo or carboxy moieties can be blended with fluoroelastomers to improve surface adhesion properties of the fluoroelastomers.

Some of the curable or film-forming polymers of this invention or blends of said polymers and other compatible polymers can be employed in making protective coatings or films, release coatings, coatings to improve surface adhesion or adhesion between materials which will normally not bond together. Some of the curable polymers of this invention or blends of said polymers and other compatible polymers can be employed in making various molded or extruded articles, e.g., O-rings, gaskets, diaphragms, and shaft seals. Some of the low molecular weight polymers of this invention are also useful as adhesives, impact modifiers, flexibilizers, coatings and lubricants. The particular application will usually be determined by the properties of the thioorgano fluoropolymer or polymer blend, the requirement of such applications being well known and described, for example, in West, A. C., and Holcomb, A. G., "Fluorinated Elastomers", Kirk-Othmer, *Encyclopedia of Chemical Technology*, 3rd Ed., 8, pp. 500–515 (John Wiley & Sons, Inc. 1977), Kovach, G. P. "Release Agents," *Encyclopedia of Polymer Science and Technology*, 12, pp. 57–65 (John Wiley & Sons, Inc. 1980), and Morton, Rubber Technology, chapter 2 and chapter 16, pp. 407–439, Van Nostrand Reinhold Company (1973). The following examples are offered to aid in a better understanding of the present invention and are not to be unnecessarily construed as limiting the scope thereof. In the examples, indicated results were obtained using the following test methods:

| | |
|---|---|
| Tensile Strength at Break | ASTM D 412-83 on a sample. |
| Elongation at Break | cut from 1.8 mm sheet unless otherwise indicated. |
| Modulus at 100% Elongation | with a ASTM Die D. |
| Cure Characteristics | ASTM D 2084-82 with a micro die, no preheat, an oscillator frequency of 100 cpm and a 3° arc. Minimum torque ($M_L$) and the highest torque attained during a specified period of time when no plateau or maximum torque is obtained ($M_H$). t'50 (time for torques to reach $M_L + 0.5 (M_H - M_L)$) and t'90 (time for torque to reach $M_L + 0.9 M_H - M_L$)). |
| Press Cure | Unless otherwise noted, 150 × 150 × 1.8 mm sheets were prepared for physical property determination by pressing at about 6.9 × 10³ kPa for 10 min. at 177° C. |
| Post Cure | Samples were removed from the press and placed in a circulating air oven. Unless otherwise stated, |

| | -continued |
|---|---|
| | the oven was maintained at 260° C. for 16 hours. |
| Accelerated Aging | ASTM D 573-72 exposed for the indicated time at 275° C. |

EXAMPLE 1

A homogeneous solution of the thiolate salt, $KS(CH_2)_{10}COOK$, was prepared by reacting a solution of 7.9 g (0.12 mole) of potassium hydroxide dissolved in 25 mL of methanol with 13.1 g (0.059 mole, 0.12 equivalents) of 11-mercaptoundecanoic acid. (11-Mercaptoundecanoic acid can be prepared by reacting 11-bromoundecanoic acid with thiourea.) A solution of a fluoropolymer precursor, a copolymer of vinylidene fluoride and hexafluoropropylene (polymer number 4, Table 1), was prepared by dissolving 100 g of the copolymer gum in 300 mL of methyl ethyl ketone (MEK). The thiolate salt solution was then added to the fluoropolymer solution to yield after about one hour at room temperature a very viscous amber solution of the product, a vinylidene fluoride-hexafluoropropylene copolymer with pendent potassium carboxylate groups. A film was spin-cast from the product, air dried overnight, and then dried under a vacuum for two hours at 65° C. The final film was about 0.5 mm thick, and had the following physical properties:

| Tensile (MPa) | 27.1 |
|---|---|
| Elongation at break (%) | 400 |

The film was found to be insoluble in MEK, soluble in methanol, and soluble in aqueous methanol solutions in dilute concentrations. The thioorgano fluoropolymer's improved solubility in methanol and its insolubility in MEK indicated that the graft reaction had taken place, precursor was modifing the solubility of the fluoropolymer precursor.

EXAMPLE 2

The thiolate salt, $KSCH_2CH_2COOK$, was prepared by adding 6.36 g of 3-mercaptopropionic acid (0.06 mole, 0.12 equiv.) to a solution of 7.9 g (0.12 mole) of potassium hydroxide dissolved in 25 mL of methanol. The thiolate salt solution was added to a MEK and fluorocarbon elastomer solution prepared by dissolving 100 g of polymer number 3, (Table 1) in 300 mL of MEK. After allowing the mixture to react for about one hour at room temperature, a viscous amber solution of the product, a vinylidene fluoride-hexafluoropropylene copolymer with pendent potassium carboxylate groups, was formed.

A film of the thioorgano fluoropolymer was cast from the product solution, allowed to air dry overnight and then dried under vacuum at 65° C. The final film had the following physical properties:

| Tensile (MPa) | 31.7 |
|---|---|
| Elongation at break (%) | 400 |
| 100% Modulus (MPa) | 12.0 |

The film was insoluble in MEK, soluble in methanol, and soluble in aqueous methanol solutions in dilute concentrations. A sample of the film that was immersed in boiling water for 24 hours had about 400% volume swell but retained its elastomeric properties. These results indicate that the solubility of the fluoropolymer precursor in polar solvents was modified by the pendent moieties. A methanol solution of the thioorgano fluoropolymer gelled immediately upon adding a methanolic solution of magnesium chloride, indicating a magnesium-salt crosslink between carboxyl groups on different polymer chains had formed.

EXAMPLE 3

The thiolate salt, $NaS(CH_2)_3Si(OCH_3)_3$, was prepared by adding 10 g of 3-mercaptopropyl trimethoxysilane, with stirring, to a solution of 10 g of sodium methoxide in 30 g of methanol. A 30 wt. % solution of polymer number 3 (Table 1) was prepared by dissolving said polymer in an 80:20 MEK:methanol solvent mixture by weight. To 20 g of the copolymer solution, 0.39 g of the thiolate salt solution was added and the solution turned pale green. This mixture was cast in a shallow aluminum dish and the solvent was allowed to evaporate at room temperature (approximately 22° C.) for about 24 hours. After solvent evaporation, a clear, homogeneous pale green film remained. This film was elastomeric and insoluble in acetone, indicating that crosslinking had occurred via reaction with adventitious moisture. The addition of a small amount of dibutyl amine to this reaction mixture allowed the use of 80% less of the thiolate salt while still yielding an elastomeric film upon solvent evaporation. The above procedure was repeated, except that 3-mercaptopropyl trimethoxysilane solution was added to the copolymer solution instead of the thiolate salt solution. A film cast from that mixture was not homogeneous, but formed a white, phase-separated matrix which was soluble in acetone, indicating that no cross linking had taken place, and that a thiolate salt was required for the grafting reaction to take place.

EXAMPLE 4

The thiolate salt, $NaSCH_2CH(OH)CH_2OH$, was prepared by adding 10 g of 3-mercapto-1,2-propanediol, with stirring, to a solution of 20.8 g of sodium methoxide dissolved in 62.4 g of methanol. A 30 wt. % solution of fluoropolymer 3 (Table 1) was prepared by dissolving said polymer in MEK. To 20 g of the polymeric solution was added 1.8 g of the thiolate salt solution. The particulate dispersion which formed initially became a clear, pale yellow solution after shaking the mixture in a closed container at room temperature for about one hour. This yellow solution contained the product, a vinylidene fluoride-hexafluoropropylene copolymer with pendent dihydroxypropylthio groups. To this solution was added an equivalent quantity (0.59 g) of isophorone diisocyanate based on the hydroxyl equivalent of the thioorgano fluoropolymer, plus a drop of dibutyltin dilaurate catalyst. The solution was cast in a 7.6 cm×7.6 cm polytetrafluoroethylene mold and allowed to dry at ambient conditions for 16 hours. The resulting yellow, translucent, elastomeric film was about 0.51 mm thick and had the following physical properties:

| Tensile (MPa) | 1.46 |
|---|---|
| Elongation at break (%) | 500 |

After curing the film in an air oven for one hour at 82° C., the film had the following physical properties:

| Tensile (MPa) | 7.58 |
| --- | --- |
| Elongation at break (%) | 50 |

The above procedure was repeated using a solution of 3-mercapto-1,2-propanediol instead of the thiolate salt solution. The resulting mixture was cast as above to form a nonhomogeneous film which did not cure even after heating at the conditions described above indicating that the thiol would not graft on the fluoroelastomer.

EXAMPLE 5

Lithium and calcium salts of 3-mercapto-1,2-propanediol were prepared according to the following ion exchange procedure. The thiolate $NaSCH_2CH(OH)CH_2OH$, was prepared by adding 10 g of 3 mercapto-1,2-propanediol to a solution of 20.8 g of sodium methoxide dissolved in 62.4 g of methanol. Equimolar quantities of the thiolate (in the form of the solution) were reacted with the chloride salts of lithium and calcium. The lithium and calcium thiolate salts formed by this reaction were reacted with MEK solutions of fluoropolymer number 3 (Table 1) prepared according to the procedure described in Example 4. Reaction with the lithium and calcium thiolate salts yielded thioorgano fluoropolymers whose films could be redissolved in MEK.

EXAMPLE 6

This example demonstrates the compatibilizing effect that pendent moieties can have on the solubility of fluoroelastomers. To a suspension of 13.26 g (0.048 mole) of triphenylmethanethiol in 15 mL MEK was added 10.2 g of a 25 wt. % solution (0.047 mole) of sodium methoxide in methanol to form a hazy, brown solution of the thiolate salt, $(C_6H_5)_3CSNa$. In three experiments, different amounts of the above thiolate salt solution were reacted with a fixed quantity of a 40 wt. % solution of fluoropolymer number 3 (Table 1) dissolved in MEK.

The amounts of reactants used are summarized in Table 2. The reaction time was 30 minutes for all reactions.

TABLE 2

|  | Run number | | |
| --- | --- | --- | --- |
|  | 1 | 2 | 3 |
| Thiolate solution, g | 1.0 | 2.0 | 3.0 |
| Polymer solution, g | 10 | 10 | 10 |

The viscosity of the solutions after the reaction varied from viscous liquids to gels, with reaction mixtures containing greater amounts of thiolate solution being more viscous. The solubility of the thioorgano fluoropolymers in toluene varied in proportion to the amount of thiolate solution that had been added to the reaction mixture. Higher levels of thiolate solution yielded thioorgano fluoropolymers that were more soluble in toluene, as exemplified by the product from runs 2 and 3 which were almost entirely soluble in toluene. Films cast from the thioorgano fluoropolymer/toluene solutions were clear to translucent and tough.

EXAMPLE 7-11 and Comparative EXAMPLE 9C

In these Examples, blends of thioorgano fluoropolymers and epoxy resins were prepared. The compositions of these blends and the characteristics of films formed from the blends are summarized in Table 3. One of the blends, (Example 10, Table 4) and a thioorgano fluoropolymer with pendent thiopropanediol groups, (Example 11, Table 4) were cured with an anhydride compound to yield tough, homogeneous films. The reactants used, cure conditions and cured film properties are summarized in Table 4. Examples 7 through 9C demonstrate the compatibilizing effect of pendent hydroxy moieties. Fluoropolymer number 3 (Table 1), as illustrated by Example 9C, is not compatible with epoxy resins. However, as illustrated by Examples 7-9, the thioorgano fluoropolymer with pendent, hydroxy moieties can be compatible with various epoxies as demonstrated by the fact that the thioorgano fluoropolymer-epoxy blends were cured to fairly homogeneous films.

TABLE 3

| | Blend components | | | | Drying conditions | | Film properties after drying |
| --- | --- | --- | --- | --- | --- | --- | --- |
| | Polymer solution | | Epoxy resin | | Time | Temp | |
| Example | Code (a) | g | Code (b) | g (c) | (hr) | (°C.) | |
| 7 | B | 12 | E1 | 3 | 16 | 22 | homogeneous |
| 8 | B | 2 | E2 | 0.6 | 16 | 22 | slight phase separation |
| 9 | B | 2 | E3 | 0.56 | 16 | 22 | slight phase separation |
| 9C | A | 2 | E3 | 0.57 | 16 | 16 | complete phase separation |

TABLE 4

| | Reactants | | | | | Curing conditions | | Film properties after curing |
| --- | --- | --- | --- | --- | --- | --- | --- | --- |
| | Polymer solution | | Epoxy resin | | Hexahydrophthalic anhydride | Time | Temp | |
| Example | code (a) | g | Code (b) | g (c) | (g) | (hr) | (°C.) | |
| 10 | B | 2 | E3 | 0.54 | 0.56 | 0.25 | 200 | tough, homogeneous film |
| 11 | C | 5 | — | — | 7 | 2 | 105 | tough, homogeneous |

TABLE 4-continued

| | Reactants | | | | | Curing conditions | | Film prop- |
|---|---|---|---|---|---|---|---|---|
| | Polymer solution | | Epoxy resin | | Hexahydro-phthalic anhydride | Time | Temp | erties |
| Example | code (a) | g | Code (b) | g (c) | (g) | (hr) | (°C.) | after curing |
| | | | | | | | | film |

(a) A = 30 wt. % solution of fluoropolymer 3 (TABLE 1) dissolved in MEK
B = Modified fluoropolymer prepared by reacting 3 g of the sodium thiolate salt of 3-mercapto-1,2-propanediol with 20 g of a 30 wt. % solution of fluoropolymer 3 (TABLE 1) in MEK.
C = Modified fluoropolymer prepared by reaction 4 g of the sodium thiolate salt of 3-mercapto-1,2-propanediol with 9 g of a 90 wt. % solution of fluoropolymer 1 (TABLE 1) dissolved in MEK.
(b) E1 = Araldite ® RD-2 available from Ciba-Geigy Corp. (1,4-butanediol di-glycidyl ether)
E2 = EponR 828 available from Shell Chemical Co. (a diepoxide based on the diglycidyl ether of Bisphenol A)
E3 = DER 732 available from Dow Chemical Co. (a poly(propyleneoxy)glycol diglycidyl ether)
(c) Each epoxy resin reactant was used as a 50 wt. % solution of the resin dissolved in MEK.

EXAMPLE 12

The thiolate salt, $NaSCH_2CH_2CH_2SO_3Na$, was prepared by adding a solution of ten grams of sodium 3-mercaptopropane sulfonate dissolved in 20 g of water, to 12.2 g of a 25 wt. % solution of sodium methoxide in methanol. A 20 wt. % solution of fluoropolymer number 3 (Table 1) dissolved in a 38:62 MEK:methanol solvent mixture was prepared, and to 10 g of this solution, 1.6 g of the above thiolate solution was added with vigorous mixing. After 30 minutes, the resulting pale yellow solution of the thioorgano fluoropolymer with pendent thiopropylsulfo groups was cast into a film with the following film properties:

| Tensile (MPa) | 19.2 |
|---|---|
| Elongation at break (%) | 900 |

The film dissolved slowly in MEK, but dissolved readily in methanol and a 60:40 methanol:water solution indicating that the pendent sulfo moieties increased the solubility of the fluoropolymer in methanol and water.

EXAMPLES 13-25

In these Examples, several fluoropolymers were reacted with the sodium thiolate salt of 3-mercapto-1,2-propanediol. The procedure described in Example 4 was followed except that different quantities of reactants and various fluoropolymer precursors were used. The reactants, quantities of reactants, and the appearance of the product solution are summarized in Table 5. Some of the resulting thioogano fluoropolymers were isolated by solvent evaporation and redissolved in MEK before curing with isophorone diisocyanate. The physical properties of cured films are summarized in Table 6. The change in the appearance of the solutions after the reactions indicates grafting had occurred. In addition, the elastomeric properties of the cured films (Examples 21-25) indicate that crosslinking and grafting occurred. Also, IR analysis of the product from Example 17 indicated that the product's hydroxy moieties could not be extracted with water, therefore, grafting occurred.

TABLE 5

| | Reactants | | | | | |
|---|---|---|---|---|---|---|
| | Polymer solution | | | | | |
| | polymer | | | | | |
| Example | Number from Table 1 | (g) | MEK (g) | Thiolate salt solution (a) (g) | Methanol (g) | Appearance of solution |
| 13 | 5 | 6.1 | 14.1 | 2.4 | 5.2 | pale yellow |
| 14 | 6 | 1.2 | 16.9 | 0.23 | 0 | slightly gelled |
| 15 | 7 | 3.2 | 25.3 | 1.3 | 0 | pale yellow |
| 16 | 8 | 5.8 | 21.9 | 2.3 | 0 | pale yellow |
| 17 | 9 | 21 | 8.2 | 6.0 (b) | 5.0 | pale yellow (c) |
| 18 | 10 | 17.1 | 7.9 | 5.5 (b) | 4.6 | brown (c) |
| 19 | 11 | 4.4 | 15.4 | 1.8 | 0 | pale yellow |
| 20 | 12 | 1.7 | 31.9 | 0.69 | 0 | gelled |

(a) Prepared by reacting 10 g of 3-mercapto-1,2-propanediol with 20.8 g of a 25 wt. % solution of sodium methoxide dissolved in methanol, then diluting reaction mixture with 30.8 g methanol.
(b) Twice as concentrated as the thiolate salt solution from (a), i.e. 3.24 mmol/g rather than 1.62 mmol/g.
(c) Vigorous reaction.

TABLE 6

| | Reactants | | | Film properties | | |
|---|---|---|---|---|---|---|
| Example | Product of example no. | (g) | Isophorone diisocyanate (g) | Thickness, (mm) | Tensile (MPa) | Elongation at break (%) |
| 21 | 13 | 5.3 | 0.23 | 0.5 | 6.0 | 350 |
| 22 | 14 | 5.4 | 0.08 | 0.2 | 6.6 | 500 |
| 23 | 15 | 5.2 | 0.10 | 0.35 | 5.7 | 1000 |
| 24 | 16 | 5.3 | 0.23 | 0.4 | 3.3 | 500 |
| 25 | 19 | 5.5 | 0.24 | 0.25 | 2.6 | 300 |

EXAMPLES 26-28

These Examples illustrate the cure of thioorgano fluoropolymers having pendent thiopropanediol groups either alone or blended with a fluoroelastomer gum, in solid state reaction. The thioorgano fluoropolymer and the thioorgano fluoropolymer-fluoroelastomer blend were mixed on a two-roll rubber mill with conventional fluoroelastomer curing ingredients, except that no dihydroxy crosslinking agent was added to the compounded gums because the pendent groups on the thioorgano fluoropolymer acted as the crosslinking agent.

Thioorgano fluoropolymer A was prepared by mixing 200 g of a 50 wt. % solution of fluoropolymer number 2 (Table 1) dissolved in an 80:20 MEK:methanol mixture with 20 g of a methanol solution of the sodium thiolate salt of 3-mercapto-1,2-propanediol (32.4 mmole which is 0.324 mmole/g of polymer). After 30 minutes, the reaction mixture was treated with 3 successive 200 mL portions of hot water to precipitate and wash the product. After a final cold water wash, the product was pressed to remove excess water and dried for 16 hours at 90° C. to give thioorgano fluoropolymer A.

Thioorgano fluoropolymer B was prepared in a similar manner to A except that fluoropolymer number 4 (Table 1) and a higher concentration of the thiolate salt were used. In this reaction, 50 g of a 30 wt. % solution of said polymer number 4 in an 80:20 MEK:methanol mixture was mixed with 6 g of a methanol solution of the sodium thiolate salt of 3-mercapto-1,2-propanediol (9.72 mmole, which is 0.648 mmole/g of polymer). The product was washed and dried as before to give the thioorgano fluoropolymer B.

The cure results and cured elastomer properties are summarized in Table 7.

TABLE 7

| | Examples | | |
|---|---|---|---|
| | 26 | 27 | 28 |
| Composition, g | | | |
| Thioorgano fluoropolymer | | | |
| A | 50 | | |
| B | | 100 | 100 |
| fluoropolymer | | | |
| No. 13 (Table 1) | 50 | | |
| Fillers, etc. | | | |
| Carbon black (a) | 20 | 30 | 30 |
| Magnesium oxide (b) | 3 | 3 | 3 |
| Calcium hydroxide | 6 | 6 | 6 |
| Accelerator | | | |
| Triphenylbenzyl phosphonium chloride | 0.5 | 0.2 | 0 |
| Rheology | | | |
| $M_L$ (N.m) | 1.6 | 3.5 | 2.7 |
| t'50 (min.) | 1.5 | 4 | 14 (c) |
| t'90 (min.) | 6 | 6 | 21 (c) |
| $M_H$ 12 min (N.m) | 4.3 | 15.8 | 6.2 |
| Press cure (10 min. @ 177° C.) | | | |
| Tensile (MPa) | 12.6 | 18.1 | |
| Elongation at break (%) | 327 | 125 | |
| Post cure (16 hours @ 232° C.) | | | |
| Tensile (MPa) | 13.7 | 17.8 | |
| Elongation at break (%) | 270 | 100 | |
| Heat aged (70 hours @ 275° C.) | | | |
| Tensile (MPa) | 7.0 | | |
| Elongation at break (%) | 90 | | |

(a) Medium thermal carbon black
(b) Maglite D, available from Merck Corporation.
(c) Still slowly curing after 24 minutes Example 26 and 27 show that the thioorgano fluoropolymer, with pendent thiopropanediol groups were cured without the addition of a crosslinking agent. The rheological properties of fluoropolymer number 4 (Table 1) compounded with the same types of fillers and accelerators as Example 27, shows a $M_L$ of about 1.2 N.m, a $M_H$, 12 minutes of about 1.2, a t'50 of about zero, and a t'90 of about zero indicating no cure. Press cure, post cure and Example 28 were not run on, because without the triphenylbenzyl phosphonium chloride accelerator the cure did not take place during the allotted test time, however, the rheological data indicates that the polymer was curing, and should completely cure.

EXAMPLES 29-31

These Examples illustrate the preparation of storage-stable thioorgano fluoropolymer solutions (i.e., solution remains homogeneous and polymer remains dissolved during the storage period). Thioorgano fluoropolymer A prepared according to the procedure given in Example 26 was used in the solutions. The results are summarized in Table 8. Curing of a cast film from a solution, and curing at 150° C. in an oven gave a tough, insoluble, elastomeric product. Addition of a tertiary amine to the thioorgano fluoropolymer solution allowed films cast from the solution to be cured at lower temperature. As illustrated by Example 31, the presence of the amine in the solution decreases storage stability, but even this solution was useful to prepare coatings after storing for up to about 2 months.

TABLE 8

| | EXAMPLES | | |
|---|---|---|---|
| | 29 | 30 | 31 |
| Composition, g | | | |
| Thioorgano fluoropolymer A (50 wt. % in MEK) | 100 | 100 | 100 |
| Diazabicycloundecene | | | 2.4 |
| Cast films heated for | | | |
| 16 hours at 82° C. | | x | x |
| 16 hours at 150° C. | x | | |
| Solubility in acetone | insoluble | soluble | insoluble |
| Storage stablity of solution after 3 months at room temperature (about 22° C.) | stable | stable | viscous solution |

EXAMPLES 32-34

This Example illustrates the cure of thioorgano fluoropolymer A (prepared according to the procedure described in Example 26) with isophorone diisocyanate to yield clear, tough films. The reactants used and the physical properties of the cured films are summarized in Table 9.

TABLE 9

| | Examples | | |
|---|---|---|---|
| | 32 | 33 | 34 |
| Composition, g | | | |
| Thioorgano fluoropolymer A (50 wt. % in MEK) | 10 | 10 | 10 |
| Isophorone diisocyanate | 0.1 | 0.2 | 0.3 |
| Dibutyltin dilaurate catalyst (drops) | 1 | 1 | 1 |
| Properties of cast film cured 10 min. at 65° C. | | | |
| Tensile (MPa) | 6.6 | 9.3 | 10.1 |
| Elongation at break (%) | 321 | 257 | 204 |

EXAMPLE 35 AND COMPARATIVE EX. 35C

This Example illustrates the use of a isophorone diisocyanate-cured, thioorgano fluoropolymer as a water-resistant coating. A coating solution was prepared by reaction of 10 g of a 40 wt. % solution in MEK of fluoropolymer number 3 (Table 1) with 2.0 g of a methanol solution of sodium thiolate salt of 3-mercapto-1,2-propanediol (6.48 mmole). The resulting product solution was mixed with 2.0 g of isophorone diisocyanate and the resulting solution coated with a brush on small concrete blocks, and the coated blocks allowed to dry for one week at room temperature (about 22° C.). The coated blocks ("I-coated blocks") were immersed in an aqueous solution containing 15 wt. % sodium chloride. In a comparative example, similar concrete blocks were coated with a conventional amine-cured fluoropolymer coating. This coating was comprised of fluoropolymer number 4 (Table 1) cured with triethylene tetramine and coated from a MEK solution. These coated blocks ("A-coated blocks") were dried at room temperature for a week, then immersed in a similar aqueous sodium chloride solution. The weight increase of the blocks due to absorbed water was measured after various immersion times, and the weight changes of the blocks during the test are summarized in Table 10.

TABLE 10

|  | Examples | |
|---|---|---|
|  | 35 | 35C |
| I-coated blocks | x |  |
| A-coated blocks |  | x |
| Aqueous sodium chloride solution absorption, g |  |  |
| Time, days |  |  |
| 4 | 3.3 | 6.2 |
| 8 | 3.7 | 8.4 |
| 14 | 4.0 | 10.4 |

EXAMPLE 36

The thiolate salt of 3-mercapto-1,2-propanediol, $NaSCH_2CH(OH)CH_2OH$ was prepared according to the procedure described in Example 4. A 90 weight % solution of polymer 1 (Table 1) was prepared by dissolving the polymer in MEK. To 10 g of the polymeric solution, 4.5 g of the thiolate salt solution was added. Excess methanol was removed from the product solution by heating said solution at 180° C. and this dried product was redissolved in MEK. An equivalent quantity (based on the hydroxyl equivalent of the thioorgano fluoropolymer) of isophoron diisocynate (3.23 g) was added to the solution along with a drop of dibutyltin dilaurate catalyst. A film was cast from the solution and allowed to dry overnight. The film was then post cured by heating in an oven at 66° C. for one hour. The film was clear, hard and brittle indicating that the polymer had cured.

Various modifications and alterations of this invention will become apparent to those skilled in the art without departing from the scope and spirit of this invention.

What is claimed is:

1. A method of making fluorine-containing polymers said polymers consisting essentially of
    (A) fluorine-containing homo- or co-polymer containing 20 to 76 weight percent carbon-bonded fluorine and comprising interpolymerized, repeating units of one or more fluoromonomers, and optionally one or more non-fluorinated monomers, wherein said non-fluorinated monomers are selected from the group consisting of ethylene, propylene and butene, and
    (B) a plurality of pendent, monothiorgano groups;
    comprising the step of reacting a fluoropolymer precursor with at least one thiolate compound.

2. The method of claim 2 wherein said thiolate compound has the general formula $$RS(M)_{1/a}$$

wherein M is a metal atom, S is a sulfur atom, R is an organic group and a is the valence of M.

3. The method of claim 2 wherein said thiolate compounds has the general formula $$(A)_n R'S(M)_{1/a}$$

where M is a metal atom, S is a sulfur atom, a is the valence of M, R' is an organic group, A is a functional moiety, and n is 1 or 2.

4. A method of making fluorine-containing polymers said polymers consisting essentially of
    (A) fluorine-containing homo- or co-polymer containing 20 to 76 weight percent carbon-bonded fluorine and comprising interpolymerized, repeating units of one or more fluoromonomers, and optionally one or more non-fluorinated monomers, wherein said non-fluorinated monomers are selected from the group consisting of ethylene, propylene and butene, and
    (B) a plurality of pendent, monothiorgano groups,
    comprising the step of reacting at least one monothiol with a fluoropolymer precursor and a base in a suitable reaction solvent.

5. A method according to claim 1 wherein said fluoropolymer precursor is selected from the group consisting of copolymers of vinylidene fluoride and one or more of the following fluoromonomers: hexafluoropropene, tetrafluoroethylene, chlorotrifluoroethylene, 2-chloropentafluoropropene, pentafluoropropene, dichlorodifluoroethylene, trifluoroethylene, 1,1-chlorofluoroethylene, 1-bromo-2,2-difluoroethylene, perfluoromethylvinyl ether, 3-iodoperfluoropropene, 4-iodoperfluoropentene, bromotrifluoroethylene, bromodifluoroethylene, and non-fluorinated monomers selected from the group consisting of ethylene, propylene, and butene.

6. A method according to claim 1 wherein said fluoropolymer precursor is selected from the group consisting of homopolymers of bromotrifluoroethylene and chlorotrifluoroethylene.

7. A method according to claim 1 wherein said thiolate compound is selected from the group consisting of $KS(CH_2)_{10}COOK$, $KSCH_2CH_2COOK$, $NaS(CH_2)_3Si(OCH_3)_3$, $NaSCH_2CH(OH)CH_2OH$, $(C_6H_5)_3CSNa$, $NaSCH_2CH_2CH_2SO_3Na$.

8. A method according to claim 4 wherein said fluoropolymer precursor is selected from the group consisting of copolymers of vinylidene fluoride and one or more of the following fluoromonomers: hexafluoropropene, tetrafluoroethylene, chlorotrifluoroethylene, 2-chloropentafluoropropene, pentafluoropropene, dichlorodifluoroethylene, trifluoroethylene, 1,1-chlorofluoroethylene, 1-bromo-2,2-difluoroethylene, perfluoromethylvinyl ether, 3-iodoperfluoropropene, 4- iodoperfluoropentene, bromotrifluoroethylene, bromodifluoroethylene, and non-fluorinated monomers selected from the group consisting of ethylene, propylene and butene.

9. A method according to claim 4 wherein said fluoropolymer precursor is selected from the group consisting of homopolymers of bromotrifluoroethylene and chlorotrifluoroethylene.

10. A method according to claim 4 wherein said mono-thiol is selected from the group consisting of 2-mercaptoethanol, 3-mercapto-1,2-propanediol, mercaptoacetic acid, 3-mercaptopropionic acid, 10-mercaptododecanoic acid, thiosalicylic acid, 2-mercaptopyrimidine, 2-mercaptopyridine, 3-mercaptopropyltrimethoxysilane, 3-mercaptopropyl methyldimethoxysilane, 2-aminoethanethiol, 4-aminothiophenol, 4-chlorothiophenol, 2-(mercaptomethyl)furan, hexanethiol, hexadecanethiol, phenylmethanethiol, n-hexadecanethiol, phenylpropanethiol, triphenylmethanethiol, n-heptanethiol, cyclohexanethiol, 1,1,2,2-tetrahydroperfluorodocanethiol, 2-aminothiophenol, N-(4-mercaptobutyl)-N-methyl perfluorooctanesulfonamide, and monothiol-group-containing poly(dimethylsiloxane).

* * * * *